US012725882B2

(12) United States Patent
Li et al.

(10) Patent No.: US 12,725,882 B2
(45) Date of Patent: Sep. 1, 2026

(54) BINDER, SEPARATOR, AND LITHIUM-ION BATTERY USING SUCH SEPARATOR

(71) Applicant: CONTEMPORARY AMPEREX TECHNOLOGY (HONG KONG) LIMITED, Hong Kong (CN)

(72) Inventors: Lei Li, Ningde (CN); Haiyang Kang, Ningde (CN); Yi Zheng, Ningde (CN); Chengdong Sun, Ningde (CN); Shaohua Ai, Ningde (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 32 days.

(21) Appl. No.: 18/498,850

(22) Filed: Oct. 31, 2023

(65) Prior Publication Data

US 2024/0097276 A1 Mar. 21, 2024

Related U.S. Application Data

(63) Continuation of application No. PCT/CN2022/116488, filed on Sep. 1, 2022.

(51) Int. Cl.

| | |
|---|---|
| ***H01M 50/446*** | (2021.01) |
| ***H01M 10/0525*** | (2010.01) |
| ***H01M 50/434*** | (2021.01) |
| ***H01M 50/443*** | (2021.01) |

(52) U.S. Cl.

CPC ..... *H01M 50/446* (2021.01); *H01M 10/0525* (2013.01); *H01M 50/434* (2021.01); *H01M 50/443* (2021.01); *H01M 2220/20* (2013.01)

(58) Field of Classification Search

CPC .............. C08F 220/14; C08F 220/1802; C08F 220/1803; C08F 220/1804; C08F 220/1805; C08F 220/1806; C08F 220/1807; C08F 220/1808; C08F 220/1809; C08F 220/1811; C08F 220/1812; C08F 220/1818; C08F 220/34; C08F 220/42; C08F 220/44; C08F 220/54; C08F 220/56; C08F 2800/10

See application file for complete search history.

(56) References Cited

U.S. PATENT DOCUMENTS

| | | | | |
|---|---|---|---|---|
| 10,130,928 | B2 * | 11/2018 | Nakatomi | H01M 4/583 |
| 10,361,415 | B2 * | 7/2019 | Ameyama | C08L 23/06 |
| 10,637,063 | B2 * | 4/2020 | Akiike | H01M 4/382 |

(Continued)

FOREIGN PATENT DOCUMENTS

| | | |
|---|---|---|
| CN | 102334215 A | 1/2012 |
| CN | 102893427 A | 1/2013 |

(Continued)

OTHER PUBLICATIONS

Machine translation of CN 102334215 (no date) (Year: 0000).*

(Continued)

*Primary Examiner* — Amanda C. Walke

(74) *Attorney, Agent, or Firm* — K&L Gates LLP

(57) ABSTRACT

This application relates to the field of lithium battery technologies, and in particular, to a binder, a separator, and a lithium-ion battery using such separator, where the binder includes a terpolymer formed by copolymerization of a first monomer unit, a second monomer unit, and a third monomer unit that are specified.

12 Claims, 2 Drawing Sheets

(56) References Cited

U.S. PATENT DOCUMENTS

| | | | | |
|---|---|---|---|---|
| 11,721,873 B2 * | 8/2023 | Jeong | H01M 50/451 429/144 |
| 11,764,441 B2 * | 9/2023 | Choi | H01M 50/489 429/129 |
| 12,212,017 B2 * | 1/2025 | Lee | H01M 50/414 |
| 2011/0281154 A1 | 11/2011 | Vissers et al. | |
| 2024/0120615 A1 * | 4/2024 | Kang | C09C 3/12 |
| 2024/0360259 A1 * | 10/2024 | Li | H01M 50/434 |

FOREIGN PATENT DOCUMENTS

| | | | | |
|---|---|---|---|---|
| CN | 105470435 A * | 4/2016 | H01M 50/44 |
| CN | 109148789 A | 1/2019 | |
| CN | 112259913 A | 1/2021 | |
| GB | 918734 A | 2/1963 | |
| JP | S4994973 A | 9/1974 | |
| JP | 2013522843 A | 6/2013 | |
| JP | 2015138657 A | 7/2015 | |
| JP | 2015185515 A | 10/2015 | |
| KR | 20110097864 A | 8/2011 | |
| WO | 2010074202 A1 | 7/2010 | |
| WO | WO-2015098586 A1 * | 7/2015 | B01J 13/14 |
| WO | 2021251092 A1 | 12/2021 | |

OTHER PUBLICATIONS

Machine translation of CN 109841779 (no date) (Year: 0000).*

ISR for International Application No. PCT/CN2022/116488 mailed May 16, 2023.

Written Opinion for International Application No. PCT/CN2022/116488 mailed May 16, 2023.

Extended European Search Report for Application No. EP22938728.7, dated Jun. 13, 2024, 36 pages.

Notice of Reasons for Refusal in the corresponding Japanese Patent Application No. 2024-525699, issued on Jun. 3, 2025.

Request for the Submission of an Opinion in Korean Patent Application No. 10-2023-7038948, issued on Jul. 1, 2025.

Notice of Allowance (with English Machine Translation), mailed Dec. 2, 2025, for corresponding Japanese Patent Application Serial No. 2024-525699.

Office Action (with English Machine Translation), mailed Nov. 17, 2025, for corresponding Korean Patent Application Serial No. 10-2023-7038948.

Office Action, mailed Mar. 4, 2026, for corresponding European Patent Application Serial No. 22938728.7.

Office Action (with English Machine Translation), mailed Mar. 17, 2026, for corresponding Korean Patent Application Serial No. 10-2023-7038948.

* cited by examiner

BINDER, SEPARATOR, AND LITHIUM-ION BATTERY USING SUCH SEPARATOR

CROSS-REFERENCE TO RELATED APPLICATIONS

This application is a continuation of International application PCT/CN2022/116488 filed on Sep. 1, 2022, the subject matter of which is incorporated herein in its entirety.

TECHNICAL FIELD

This application relates to the field of lithium battery technologies, and in particular, to a binder, a separator, and a lithium-ion battery using such separator.

BACKGROUND

In recent years, with increasingly wide use of lithium-ion batteries, lithium-ion batteries have been widely used in energy storage power supply systems such as hydroelectric, thermal, wind, and solar power plants, and many other fields including electric tools, electric bicycles, electric motorcycles, electric vehicles, military equipment, and aerospace. Along with the great development of lithium-ion batteries, higher requirements are imposed on their energy density, cycling performance, safety performance, and the like.

Separators of lithium-ion batteries prevent electrons from passing through but allow ion migration, facilitating rapid transport of lithium ions between the positive and negative electrodes during charging and discharging. Binders are often used in separators of lithium-ion batteries. However, existing binders have problems of low compatibility with ceramic particles and poor adhesion to electrodes and separators. As a result, particles in the coating tend to peel off, affecting the safety performance of lithium-ion batteries. At present, commercially available polyolefin separators and coating films have defects of low heat resistance, proneness to shrinkage when heated, and vulnerability to puncture. These defects may lead to growth of lithium dendrites, thermal runaway, and direct contact between positive and negative electrodes, thereby causing battery short circuits and affecting the safety and service life of lithium-ion batteries.

Therefore, the prior art still needs a separator with superb comprehensive performance, including resistance to high temperature, high performance, and high safety performance.

SUMMARY

This application has been made in view of the foregoing issues and is intended to provide a binder, a separator, and a lithium-ion battery using such separator. To achieve the foregoing objectives, a first aspect of this application provides a binder including a terpolymer formed by copolymerization of a first monomer unit, a second monomer unit, and a third monomer unit. The first monomer is selected from $C_1$-$C_{20}$ alkyl (meth)acrylate; the second monomer is selected from at least one of acrylonitrile and methacrylonitrile; the third monomer is selected from at least one optionally substituted (meth)acrylamide; and a molar ratio of the first monomer unit, the second monomer unit, and the third monomer unit is 50-58:40-44:2-6.

In addition to increasing the viscosity and swelling resistance of the binder, the acrylic monomer, which is a flexible monomer chain segment in a molecular chain segment, can regulate a glass transition temperature of the binder and therefore plays an active role in increasing the viscosity of the binder. With a high polarity, the cyano group can promote the ionic conductivity. The amide group has a major function of connection through polymerization that is based on a normal mechanism of addition reaction to increase the molecular weight, and also stabilizes the binder. When the molar ratio of the three monomers is controlled within the specified range, the viscosity of the binder is ensured and the molecular weight and glass transition temperature of the binder are controlled.

In an embodiment, the terpolymer has a structure denoted by the following general formula (I):

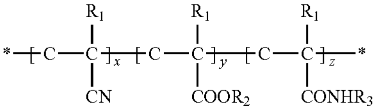

(I)

where each $R_1$ is identical or independently different H or methyl;

$R_2$ is a $C_1$-$C_{20}$ alkyl group, a $C_3$-$C_{20}$ cycloalkyl group, or a $C_1$-$C_{20}$ hydroxyalkyl group, optionally a $C_1$-$C_{12}$ alkyl group, a $C_3$-$C_{12}$ cycloalkyl group, or a C-$C_{12}$ hydroxyalkyl group; and $R_2$ is further optionally a methyl group, an ethyl group, an n-propyl group, an isopropyl group, an n-butyl group, a sec-butyl group, a tert-butyl group, an n-pentyl group, an n-octyl group, an isooctyl group, a 2-ethylhexyl group, a dodecyl group, or an isobornyl group;

$R_3$ is H, or a $C_1$-$C_6$ alkyl group monosubstituted by $OR_4$, and $R_4$ is H or a $C_1$-$C_6$ alkyl group; where $R_4$ is further optionally H, a methyl group, an ethyl group, an n-propyl group, or an n-butyl group; and x, y, and z are each independently an integer selected from 50-2000, optionally an integer selected from 100-500.

In an embodiment, a weight-average molecular weight Mw of the terpolymer is 40000-150000 g/mol, optionally 60000-120000 g/mol. When the weight-average molecular weight of the binder is within the foregoing range, the binder is fluid to a certain extent in a pre-pressing process, and therefore, the adhesion effect of the binder is ensured during preparation of a battery cell.

In an embodiment, the $C_1$-$C_{20}$ alkyl (meth)acrylate is selected from one or more of methyl acrylate, ethyl acrylate, n-butyl acrylate, isobutyl acrylate, sec-butyl acrylate, tert-butyl acrylate, n-propyl acrylate, cyclohexyl acrylate, lauryl acrylate, 2-ethylhexyl acrylate, 2-hydroxyethyl acrylate, 2-hydroxypropyl acrylate, methyl methacrylate, ethyl methacrylate, n-butyl methacrylate, 2-ethylhexyl methacrylate, isobornyl methacrylate, lauryl methacrylate, 2-hydroxyethyl methacrylate, and 2-hydroxypropyl methacrylate. In an embodiment, the third monomer is selected from one or more of acrylamide, N-hydroxymethyl acrylamide, and N-butoxymethyl acrylamide.

In an embodiment, a glass transition temperature Tg of the terpolymer is −20° C. to 40° C., optionally 0° C. to 20° C.

A second aspect of this application provides a separator including a base layer and a binding layer stacked sequentially, where the binding layer includes the binder according to any one of claims 1 to 6, thermally expandable microspheres, and ceramic particles.

The binder of this application has a strong adhesion force. This enhances the adhesion force of the thermally expandable microspheres and the ceramic particles and avoids peel-off of particles applied on the separator. When thermal runaway occurs on a battery, the thermally expandable microspheres expand rapidly, filling gaps between the microsphere particles in time to improve the pore closing performance of the separator. The ceramic particles can guarantee the dimensional stability of the separator upon a rise in temperature. The three work together to improve the safety performance of lithium-ion batteries.

In an embodiment, a glass transition temperature of the thermally expandable microspheres is 40-100° C., optionally 60-90° C. A median particle size $D_v50$ of the thermally expandable microspheres is 0.1 μm-2 μm, optionally 0.3 μm-1.5 μm.

In an embodiment, the ceramic particles are at least one of alumina, boehmite, silica, and titanium dioxide, with a median particle size $D_v50$ of 0.5 μm-5 μm, optionally 1 μm-3.5 μm.

In an embodiment, a mass ratio of the binder, the thermally expandable microspheres, and the ceramic particles is 25-30:10-20:50-65.

When the mass ratio of the binder, thermally expandable microspheres, and the ceramic particles is controlled within the specified range, the performance of the separator can be improved significantly. When the amount of binder is small, the thermally expandable microspheres and the ceramic particles cannot be fully covered or bound, and peel-off occurs; when the amount of binder is large, percentages of the thermally expandable microspheres and ceramic particles are affected, reducing the expansion efficiency of the thermally expandable microspheres. When the amount of thermally expandable microspheres is small, the pores of the separator cannot be fully closed after an expansion. When the amount of ceramic particles is small, the thermal stability of the separator is affected, affecting the safety performance of lithium-ion batteries.

A third aspect of this application provides a lithium-ion battery including the binder according to the first aspect of this application or the separator according to the second aspect of this application.

A fourth aspect of this application provides a battery pack including the lithium-ion battery according to the third aspect of this application.

A fifth aspect of this application provides an electric apparatus including the lithium-ion battery according to the third aspect of this application or the battery pack according to the fourth aspect of this application.

BRIEF DESCRIPTION OF DRAWINGS

To describe the technical solutions in this application more clearly, the following briefly describes the accompanying drawings required for describing the embodiments of this application. Apparently, the accompanying drawings in the following description show merely some embodiments of this application, and a person of ordinary skill in the art may still derive other drawings from these accompanying drawings without creative efforts.

DESCRIPTION OF REFERENCE SIGNS

Figure 1:
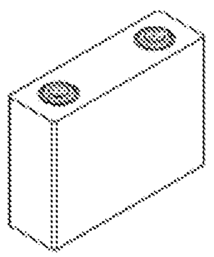
FIG. 1 is a schematic diagram of a lithium-ion secondary battery in one embodiment of this application.

1: battery pack;
2: upper box body;
3: lower box body;
4: battery module;
5: lithium-ion secondary battery;
51: housing;
52: electrode assembly; and
53: cover plate;

DETAILED DESCRIPTION

Hereinafter, embodiments of a binder, a separator, and a lithium-ion battery using such separator in this application are specifically disclosed in detail with appropriate reference to the accompanying drawings. However, there may be cases where unnecessary detailed descriptions are omitted. For example, detailed descriptions of a well-known matter and repeated descriptions of actually identical structures have been omitted. This is to avoid unnecessary redundancy and to facilitate understanding by a person skilled in the art. In addition, the accompanying drawings and the following descriptions are provided for persons skilled in the art to fully understand this application and are not intended to limit the subject matter recorded in the claims.

"Ranges" disclosed in this application are defined in the form of lower and upper limits, and a given range is defined by selecting a lower limit and an upper limit, where the selected lower and upper limits define the boundaries of the particular range. Ranges defined in this manner may be inclusive or exclusive of limiting values, and the limiting values may be randomly paired, that is, any lower limit may be paired with any upper limit to form a range. For example, if ranges 60-120 and 80-110 are listed for a particular parameter, it is also predictable to construe the ranges as 60-110 and 80-120. In addition, if 1 and 2 are listed as the minimum range values, and 3, 4, and 5 are listed as the maximum range values, the following ranges are all predictable: 1-3, 1-4, 1-5, 2-3, 2-4, and 2-5. In this application, unless otherwise stated, the numerical range "a-b" represents an abbreviated representation of any combination of real numbers between a and b, where both a and b are real numbers. For example, the numerical range "0-5" means that all real numbers between "0-5" are listed herein, and "0-5" is just an abbreviated representation of the combinations of these numerical values. In addition, when a parameter is expressed as an integer greater than or equal to 2, this is equivalent to that the parameter is, for example, an integer of 2, 3, 4, 5, 6, 7, 8, 9, 10, 11, 12, and the like.

Unless otherwise specified, all the embodiments and optional embodiments in this application may be combined to form a new technical solution.

Unless otherwise specified, all the technical features and optional features in this application may be combined to form a new technical solution.

Unless otherwise specified, all the steps in this application may be performed sequentially or randomly, or preferably performed sequentially. For example, a method including steps (a) and (b) indicates that the method may include steps (a) and (b) performed in order or may include steps (b) and (a) performed in order. For example, that the method may further include step (c) indicates that step (c) may be added to the method in any sequence. For example, the method may include steps (a), (b), and (c), steps (a), (c), and (b), steps (c), (a), and (b), or the like.

Unless otherwise specified, "comprise" and "include" mentioned in this application may be exclusive or inclusive. For example, "comprise" and "include" may comprise or include other components not listed, or may comprise or include only the listed components.

In this application, a term "or" is inclusive unless otherwise specified. For example, a phrase "A or B" means "A, B, or both A and B". More specifically, any of the following conditions satisfies the condition "A or B": A is true (or present) and B is false (or not present); A is false (or not present) and B is true (or present); or both A and B are true (or present).

A term "(meth)acrylate" includes technical solutions of acrylic acid and methacrylate. Similarly, "(meth)acrylamide" includes technical solutions of acrylamide and methacrylamide.

In the prior art, separators for lithium-ion batteries generally have problems of insufficient binding and low compatibility between a binder and ceramic particles. Therefore, the separators present low heat resistance, proneness to shrinkage when heated, and vulnerability to puncture. In this case, it is beneficial to enhance the adhesion force of the binder and the compatibility between constituents of the separator, so as to maintain stability in the case of thermal runaway, close pores and reduce gas transmission rate. Therefore, the art needs a new binder for a separator, which can effectively bind the constituents of the separator and work in synergy with these constituents to improve the safety and stability of the separator under extreme conditions.

Specifically, a first aspect of this application provides a binder including a terpolymer formed by copolymerization of a first monomer unit, a second monomer unit, and a third monomer unit. The first monomer is selected from $C_1$-$C_{20}$ alkyl (meth)acrylate; the second monomer is selected from at least one of acrylonitrile and methacrylonitrile; the third monomer is selected from at least one optionally substituted (meth)acrylamide; and a molar ratio of the first monomer unit, the second monomer unit, and the third monomer unit is 50-58:40-44:2-6.

Among the three monomers, in addition to increasing the viscosity and swelling resistance of the binder, the acrylic monomer, which is a flexible monomer chain segment in a molecular chain segment, can regulate a glass transition temperature of the binder and therefore plays an active role in increasing the viscosity of the binder. With a high polarity, the cyano group can promote the ionic conductivity. The amide group has a major function of connection through polymerization that is based on a normal mechanism of addition reaction to increase the molecular weight, and also stabilizes the binder. When the molar ratio of the three monomers is controlled within the specified range, the viscosity of the binder is ensured and the molecular weight and glass transition temperature of the binder are controlled.

In some embodiments, the terpolymer has a structure denoted by the following general formula (I):

(I)

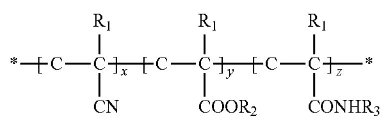

where each $R_1$ is identical or independently different H or methyl;

$R_2$ is a $C_1$-$C_{20}$ alkyl group, a $C_3$-$C_{20}$ cycloalkyl group, or a $C_1$-$C_{20}$ hydroxyalkyl group, optionally a $C_1$-$C_{12}$ alkyl group, a $C_3$-$C_{12}$ cycloalkyl group, or a $C_1$-$C_{12}$ hydroxyalkyl group; and $R_2$ is further optionally a methyl group, an ethyl group, an n-propyl group, an isopropyl group, an n-butyl group, a sec-butyl group, a tert-butyl group, an n-pentyl group, an n-octyl group, an isooctyl group, a 2-ethylhexyl group, a dodecyl group, or an isobornyl group;

$R_3$ is H, or a $C_1$-$C_6$ alkyl group monosubstituted by $OR_4$, and $R_4$ is H or a $C_1$-$C_6$ alkyl group; where $R_4$ is further optionally H, a methyl group, an ethyl group, an n-propyl group, or an n-butyl group; and x, y, and z are each independently an integer selected from 50-2000, optionally an integer selected from 100-500.

In this application, the structure denoted by the general formula (I) is not intended to limit the terpolymer of this application to the form of an alternating block copolymer of $C_1$-$C_{20}$ alkyl (meth)acrylate, (meth)acrylonitrile and (meth) acrylamide, but indicates a type and relative amount of each monomer unit. It can be understood that the foregoing structure further includes other possible block copolymers and random copolymers of the foregoing monomer units. The binder of this application may further include a mixture containing the terpolymer with the structure denoted by the general formula (I). x, y and z should be so selected that relative proportions of the monomer units in the resulting terpolymer satisfy the foregoing range. In addition, * corresponds to an end group of the terpolymer. As described above, amount of the end group is extremely low and has no substantial effect on the terpolymer.

In some embodiments, a weight-average molecular weight Mw of the terpolymer is 40000-150000 g/mol, optionally 60000-120000 g/mol. When the weight-average molecular weight of the binder is within the foregoing range, the binder is fluid to a certain extent in a pre-pressing process, and therefore, the adhesion effect of the binder is ensured during preparation of a battery cell.

In some embodiments, the $C_1$-$C_{20}$ alkyl (meth)acrylate is selected from one or more of methyl acrylate, ethyl acrylate, n-butyl acrylate, isobutyl acrylate, sec-butyl acrylate, tert-butyl acrylate, n-propyl acrylate, cyclohexyl acrylate, lauryl acrylate, 2-ethylhexyl acrylate, 2-hydroxyethyl acrylate, 2-hydroxypropyl acrylate, methyl methacrylate, ethyl methacrylate, n-butyl methacrylate, 2-ethylhexyl methacrylate, isobornyl methacrylate, lauryl methacrylate, 2-hydroxyethyl methacrylate, and 2-hydroxypropyl methacrylate. In some other embodiments, the third monomer is selected from one or more of acrylamide, N-hydroxymethyl acrylamide, and N-butoxymethyl acrylamide.

In some embodiments, a glass transition temperature Tg of the terpolymer is −20° C. to 40° C., optionally 0° C. to 20° C. With Tg being adjusted, the terpolymer can be improved in fluidity, applied more easily, and more compatible with ceramic particles. Tg can be measured using the following test method: 1. sample preparation: a thin film-like sample is punched into a small disk with a diameter of 6 mm, 1-3 mg is weighed, put into an Al crucible, and then flattened, the crucible lid is placed upside down, 1-3 mg of solid-like sample is weighed, and the crucible lid is put on; 2. parameter setting: in the nitrogen atmosphere, 50 mL/min of purge gas and 100 mL/min of protective gas are injected; 3. temperature rise process: the temperature is increased at a rate of 10° C./min for the range of 35° C. to 200° C. and maintained at 300° C. for 3 minutes; the temperature is decreased at a rate of 10° C./min for the range of 200° C. to −40° C. and maintained at −40° C. for 3 minutes; and finally the temperature is increased at a rate of 10° C./min for the range of −40° C. to 200° C. The instrument used is a Discovery 250 differential scanning calorimeter.

A second aspect of this application provides a separator including a base layer and a binding layer stacked sequentially, where the binding layer includes the binder provided in the first aspect of this application, thermally expandable microspheres, and ceramic particles.

The binder of this application has a strong adhesion force. This enhances the adhesion force of the thermally expandable microspheres and the ceramic particles and avoids peel-off of particles applied on the separator. When thermal runaway occurs on a battery, the thermally expandable microspheres expand rapidly, filling gaps between the microsphere particles in time to improve the pore closing performance of the separator. The ceramic particles can guarantee the dimensional stability of the separator upon a rise in temperature. The three work together to improve the safety performance of lithium-ion batteries. The base layer may be made of a material conventionally used in separators in the prior art, including but not limited to polypropylene, polyethylene, polypropylene-polyethylene composite, polyamide, polyimide, and polyester materials, such as PET film, cellulose film, spandex, or aramid film. Polypropylene, polyethylene or polypropylene-polyethylene composite is preferably used. A thickness of the base layer may be 5-100 μm or 10-50 μm. Micropores may be distributed all over the base layer, so that lithium ions can be effectively conducted through the separator. A pore diameter of the micropore may be 40-200 nm, for example, 60-120 nm.

The binding layer includes the binder provided in the first aspect of this application, thermally expandable microspheres, and ceramic particles. The binder is mainly used to provide an adhesion force, so as to bind the base layer to the binding layer and bind together constituents of the binding layer. The thermally expandable microspheres have a core-shell structure, with an outer shell being an elastic mesh cladding formed by polymer crosslinking and an inner core being an expandable substance or a phase change material. An exemplary core material is hydrocarbon, which is liquid at room temperature, and vaporizes and expands in volume at higher temperatures, for example, 65° C., enlarging the entire thermally expandable microsphere, filling gaps between microsphere particles, and improving the pore closing performance of the separator. The ceramic particles have excellent dimensional stability. Therefore, it can be ensured that the separator has a stable overall shape without cracking even in the case of thermal runway at high temperatures. As an inorganic material, the ceramic particles have low viscosity and tend to disperse, so a binder is required to tightly bind them and bind them with the thermally expandable microspheres. The inventors have found that combined use of the binder of this application, the thermally expandable microspheres, and the ceramic particles can synergistically improve the airtightness of the separator at high temperatures and significantly reduce the gas permeability of the separator under thermal runaway conditions, thereby improving the safety of the separator.

In some embodiments, a glass transition temperature of the thermally expandable microspheres is 40-100° C., optionally 60-90° C. The glass transition temperature of the thermally expandable microspheres refers to a glass transition temperature of a polymer in the core layer. For a measurement method of the glass transition temperature, refer to the method for measuring Tg of the terpolymer described above. A median particle size $D_v50$ of the thermally expandable microspheres is 0.1 μm-2 μm, optionally 0.3 μm-1.5 μm. If the median particle size is excessively small, the thermal expansion performance is insufficient. If the median particle size is excessively large, gaps between particles are excessively large, which is not conducive to binding.

In some embodiments, the ceramic particles are at least one of alumina, boehmite, silica, and titanium dioxide, with a median particle size $D_v50$ of 0.5 μm-5 μm, optionally 1 μm-3.5 μm. The ceramic particles have superb dimensional stability due to flame retardance, high hardness, and resistance to deformation when heated. Ceramic materials have a low thermal conductivity and can further prevent some points of thermal runaway in a battery from spreading to cause overall thermal runaway, thereby improving the safety of the battery. A large quantity of hydrophilic groups such as —OH are distributed on the surface of ceramic particles, and this can increase the infiltration and electrolyte retention of the separator, thereby improving the charge-discharge performance of lithium-ion batteries.

In some embodiments, a mass ratio of the binder, the thermally expandable microspheres, and the ceramic particles is 25-30:10-20:50-65. When the mass ratio of the binder, thermally expandable microspheres, and the ceramic particles is controlled within the specified range, the performance of the separator can be improved significantly. When the amount of binder is small, the thermally expandable microspheres and the ceramic particles cannot be fully covered or bound, and peel-off occurs. When the amount of binder is large, percentages of the thermally expandable microspheres and ceramic particles are affected, reducing the expansion efficiency of the thermally expandable microspheres. When the amount of thermally expandable microspheres is small, the pores of the separator cannot be fully closed after an expansion. When the amount of ceramic particles is small, the thermal stability of the separator is affected, affecting the safety performance of lithium-ion batteries. Relative proportions of constituents can be adjusted by adjusting the amount of each constituent added during preparation of the binding layer. For example, the three constituents are added into a mechanical stirrer at a specified weight ratio, deionized water is added, and mixing and stirring are performed to form a uniform aqueous slurry. The obtained slurry is applied on the base layer at a certain thickness and dried, where a coating density may be 0.1-3 $g/m^2$. Then winding is performed to obtain the separator.

A third aspect of this application provides a lithium-ion battery including the binder according to the first aspect of this application or the separator according to the second aspect of this application.

A fourth aspect of this application provides a battery pack including the lithium-ion battery according to the third aspect of this application.

A fifth aspect of this application provides an electric apparatus including the lithium-ion battery according to the third aspect of this application or the battery pack according to the fourth aspect of this application.

Materials of assemblies of the lithium-ion battery in this application may be selected from wide ranges. In some embodiments, the battery is particularly a lithium-ion secondary battery. The following describes in detail a battery cell of the lithium-ion secondary battery.

Generally, a lithium-ion secondary battery includes a positive electrode plate, a negative electrode plate, a separator, and an electrolyte. During charging and discharging of the battery, active ions migrate between the positive electrode plate and the negative electrode plate. The separator is provided between the positive electrode plate and the negative electrode plate for separation. The electrolyte conducts ions between the positive electrode plate and the negative electrode plate.

[Electrolyte]

The electrolyte conducts ions between the positive electrode plate and the negative electrode plate. The electrolyte includes an electrolytic salt and a solvent.

In this application, the electrolytic salt may be an electrolytic salt commonly used in lithium-ion secondary batteries, for example, lithium salt, including lithium salt that may be used as salt with high thermal stability as described above, lithium salt used as a low impedance additive, or lithium salt inhibiting corrosion of aluminum foil. In an example, the electrolytic salt may be selected from more than one of lithium hexafluorophosphate ($LiPF_6$), lithium tetrafluoroborate ($LiBF_4$), lithium hexafluoroarsenate ($LiAsF_6$), lithium bisfluorosulfonyl imide (LiFSI), lithium bistrifluoromethane sulfonimide (LiTFSI), lithium trifluoromethanesulfonate (LiTFS), lithium difluorooxalate borate (LiDFOB), lithium difluorophosphate ($LiPO_2F_2$), lithium difluorodifluorooxalate phosphate (LiDFOP), lithium fluorosulfonate ($LiSO_3F$), fluorine dioxalate (NDFOP), $Li_2F(SO_2N)_2SO_2F$, KFSI, CsFSI, $Ba(FSI)_2$, and $LiFSO_2NSO_2CH_2CH_2CF_3$.

The solvent is not limited to a specific type, and may be selected based on actual needs. In some embodiments, the solvent is a non-aqueous solvent. Optionally, the solvent may include one or more of chain carbonate, cyclic carbonate, or carboxylate. In some embodiments, the solvent may be selected from more than one of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), gamma butyrolactone (GBL), sulfolane (SF), methyl sulfonyl methane (MSM), methyl ethyl sulfone (EMS), and diethyl sulfone (ESE).

In some embodiments, the electrolyte may further optionally include other additives. For example, the additive may include a negative electrode film-forming additive, or may include a positive electrode film-forming additive, or may include an additive capable of improving some performance of a battery, for example, an additive for improving overcharge performance of the battery, an additive for improving high-temperature performance of the battery, and an additive for improving low-temperature performance of the battery. In an example, the additive is selected from at least one of a cyclic carbonate compound containing an unsaturated bond, a halogen-substituted cyclic carbonate compound, a sulfate ester compound, a sulfite compounds, sultone compound, a disulfonic acid compound, a nitrile compound, an aromatic compound, an isocyanate compound, a phosphazene compound, a cyclic acid anhydride compound, a phosphite compound, a phosphate compound, a borate compound, and a carboxylate compound.

[Positive Electrode Plate]

The positive electrode plate includes a positive electrode current collector and a positive electrode active substance layer provided on at least one surface of the positive electrode current collector. The positive electrode active substance layer includes a positive electrode active material and a conductive agent.

In an example, the positive electrode current collector has two surfaces opposite in its thickness direction, and the positive electrode active substance layer is provided on either or both of the two opposite surfaces of the positive electrode current collector.

In the lithium-ion secondary battery of this application, the positive electrode current collector may be metal foil or a composite current collector. For example, the metal foil may be aluminum foil. The composite current collector may include a polymer material matrix and a metal layer formed on at least one surface of the polymer material matrix. The composite current collector may be formed by forming a metal material (for example, aluminum, an aluminum alloy, nickel, a nickel alloy, titanium, a titanium alloy, or silver and a silver alloy) on the polymer material matrix (for example, a matrix of polypropylene (PP), polyethylene terephthalate (PET), polybutylene terephthalate (PBT), polystyrene (PS), or polyethylene (PE)).

The positive electrode active substance layer provided on the surface of the positive electrode current collector includes a positive electrode active material. The positive electrode active material used in this application may be any conventional positive electrode active material used in secondary batteries. In some embodiments, the positive electrode active material may include one or more of lithium transition metal oxide, olivine-structured lithium-containing phosphate, and respective modified compounds thereof. Examples of the lithium transition metal oxide may include but are not limited to one or more of lithium cobalt oxide, lithium nickel oxide, lithium manganese oxide, lithium nickel cobalt oxide, lithium manganese cobalt oxide, lithium nickel manganese oxide, lithium nickel cobalt manganese oxide, lithium nickel cobalt aluminum oxide, and modified compounds thereof. Examples of the olivine-structured lithium-containing phosphate may include but are not limited to, one or more of lithium iron phosphate, lithium iron phosphate-carbon composite, lithium manganese phosphate, lithium manganese phosphate-carbon composite, lithium iron manganese phosphate, lithium iron manganese phosphate-carbon composite, and modified compounds thereof. These materials are all commercially available. The surface of the positive electrode active material may be coated with carbon.

The positive electrode active substance layer may optionally include the conductive agent. However, the conductive agent is not limited to a specific type, and may be selected by those skilled in the art based on actual needs. In an example, the conductive agent for the positive electrode material may be selected from more than one of superconducting carbon, acetylene black, carbon black, Ketjen black, carbon dot, carbon nanotube, graphene, and carbon nanofiber.

The positive electrode active substance layer further includes an aqueous binder. The aqueous binder may be one or more of soluble polysaccharide and their derivatives and a water-soluble or water-dispersible polymer. In an example, the aqueous binder may be methylcellulose and salts thereof, xanthan gum and salts thereof, chitosan and salts thereof, alginic acid and salts thereof; and polyethyleneimine and salts thereof, polyacrylamide, and an acrylic copolymer and derivatives thereof. Particularly, the aqueous binder is a compound of xanthan gum and acrylic copolymer, with a compounding weight ratio of 2:1-0.2:2.8. Optionally, the xanthan gum has a weight-average molecular weight of 300000-2000000 g/mol and the acrylic copolymer has a weight-average molecular weight of 100000-1000000 g/mol.

In this application, the positive electrode plate may be prepared using a method known in the art. In an example, the positive electrode active material coated with carbon, the conductive agent, and the aqueous binder may be dispersed in a solvent (for example, water) to form a uniform positive electrode slurry. The positive electrode slurry is applied on the positive electrode current collector, and the positive electrode plate is obtained after drying, cold pressing, and other processes.

[Negative Electrode Plate]

The negative electrode plate includes a negative electrode current collector and a negative electrode material layer provided on at least one surface of the negative electrode current collector, and the negative electrode material layer includes a negative electrode active substance.

In an example, the negative electrode current collector has two surfaces opposite in its thickness direction, and the negative electrode material layer is provided on either or both of the two opposite surfaces of the negative electrode current collector.

In the lithium-ion secondary battery of this application, the negative electrode current collector may be metal foil or a composite current collector. For example, the metal foil may be copper foil. The composite current collector may include a polymer material matrix and a metal layer formed on at least one surface of the polymer material matrix. The composite current collector may be formed by forming a metal material (for example, copper, a copper alloy, nickel, a nickel alloy, titanium, a titanium alloy, or silver and a silver alloy) on a polymer material matrix (for example, a matrix of polypropylene (PP), polyethylene terephthalate (PET), polybutylene terephthalate (PBT), polystyrene (PS), polyethylene (PE)).

In the lithium-ion secondary battery of this application, the negative electrode material layer usually includes the negative electrode active substance and optionally includes a binder, a conductive agent, and other additives, and is usually formed by being coated with a negative electrode slurry and dried. The negative electrode slurry is usually obtained by dispersing the negative electrode active substance and the optional conductive agent, the optional binder, and the like in a solvent and stirring them to a uniform mixture. The solvent may be N-methylpyrrolidone (NMP) or deionized water.

The negative electrode active substance is not limited to a specific type and may be an active substance known in the art that can be used as the negative electrode of a lithium-ion secondary battery, and those skilled in the art may select based on actual needs. In an example, the negative electrode active substance may be selected from one or more of graphite, soft carbon, hard carbon, mesocarbon microsphere, carbon fiber, carbon nanotube, elemental silicon, a silicon-oxygen compound, a silicon-carbon composite, and lithium titanate.

In an example, the conductive agent may be selected from more than one of superconducting carbon, acetylene black, carbon black, Ketjen black, carbon dot, carbon nanotube, graphene, and carbon nanofiber.

In an example, the binder may be selected from more than one of styrene-butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS).

The other optional additives are, for example, a thickener (for example, sodium carboxymethyl cellulose (CMC-Na)) and the like.

[Separator]

The lithium-ion secondary battery using an electrolyte includes a separator. The separator is provided between the positive electrode plate and the negative electrode plate for separation. The separator of this application is described as above. However, the lithium-ion battery of this application may further include a conventional separator. The conventional separator is not limited to a specific type, and any known porous separator with good chemical stability and mechanical stability may be selected. In some embodiments, a material of the conventional separator may be selected from more than one of glass fiber, non-woven fabric, polyethylene, polypropylene, and polyvinylidene fluoride. The separator may be a single-layer film or a multi-layer composite film, which is not specifically limited. When the separator is a multi-layer composite film, layers may be made of the same or different materials, which is not specifically limited.

In some embodiments, the positive electrode plate, the negative electrode plate, and the separator may be made into an electrode assembly through a winding process or a laminating process.

In some embodiments, the secondary battery may include an outer package. The outer package may be used for packaging the foregoing electrode assembly and electrolyte.

In some implementations, the outer package of the secondary battery may be a hard shell, for example, a hard plastic shell, an aluminum shell, or a steel shell. The outer package of the secondary battery may alternatively be a soft pack, for example, a soft pouch. The soft pack may be made of plastic, for example, polypropylene (PP), polybutylene terephthalate (PBT), and polybutylene succinate (PBS).

The secondary battery is not limited to a particular shape in this application, and may be cylindrical, rectangular, or of any other shapes. For example, FIG. 1 shows an example of a lithium-ion secondary battery 5 with a prismatic structure.

Figure 2:
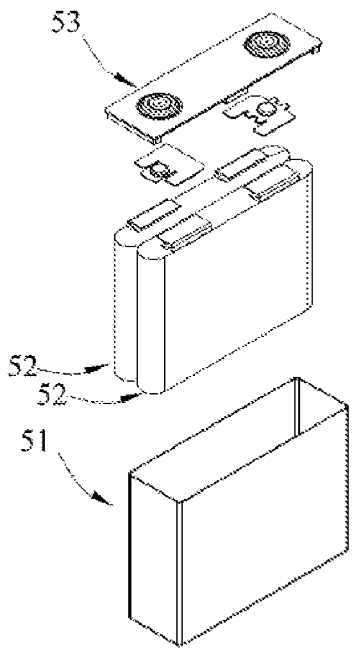
FIG. 2 is an exploded view of the lithium-ion secondary battery in one embodiment of this application shown in FIG. 1.

In some embodiments, referring to FIG. 2, the outer package may include a housing 51 and a cover plate 53. The housing 51 may include a bottom plate and side plates connected to the bottom plate, and the bottom plate and the side plates enclose an accommodating cavity. The housing 51 has an opening communicating with the accommodating cavity, and the cover plate 53 can cover the opening to close the accommodating cavity. The positive electrode plate, the negative electrode plate, and the separator may be wound or laminated to form an electrode assembly 52. The electrode assembly 52 is packaged in the accommodating cavity. The electrolyte infiltrates the electrode assembly 52. The lithium-ion secondary battery 5 may include one or more electrode assemblies 52, which may be selected by persons skilled in the art based on actual needs.

In some embodiments, lithium-ion secondary batteries may be assembled into a battery module 4, and the battery module may include one or more lithium-ion secondary batteries. A specific quantity may be selected by persons skilled in the art based on the application and capacity of the battery module 4. In the battery module 4, the plurality of lithium-ion secondary batteries 5 may be sequentially arranged in a length direction of the battery module. Certainly, the batteries may alternatively be arranged in any other manners. Further, the plurality of lithium-ion secondary batteries 5 may be fixed by fasteners. Optionally, the battery module 4 may further include a housing with an accommodating space, and the plurality of lithium-ion secondary batteries 5 are accommodated in the accommodating space.

In some embodiments, the foregoing lithium-ion secondary batteries 5 or battery modules 4 may be assembled into a battery pack 1. A quantity of lithium-ion secondary batteries 5 or battery modules 4 included in the battery pack 1 may be selected by persons skilled in the art based on the application and capacity of the battery pack 1.

Figure 3:
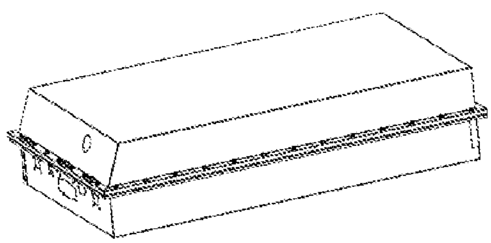
FIG. 3 is a schematic diagram of a battery pack in one embodiment of this application.
Figure 4:
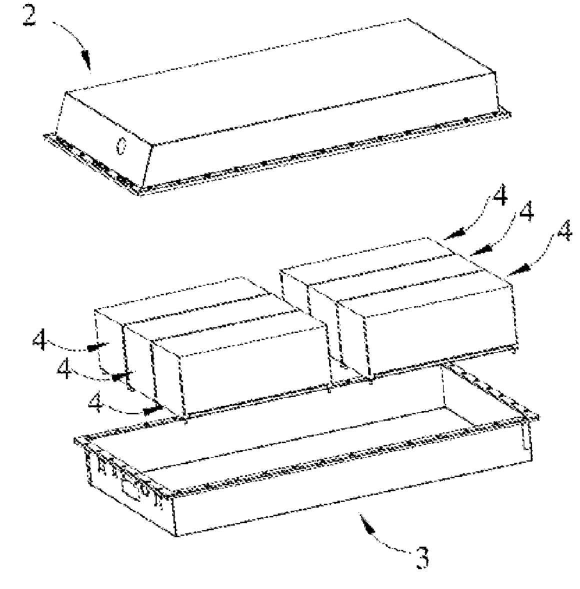
FIG. 4 is an exploded view of the battery pack in one embodiment of this application shown in FIG. 3.

FIG. 3 and FIG. 4 show an example of the battery pack 1. Referring to FIG. 3 and FIG. 4, the battery pack 1 may include a battery box and a plurality of battery cells provided in the battery box. The battery box includes an upper box body 2 and a lower box body 3. The upper box body 2 can be provided over the lower box body 3 to form an enclosed space for holding the battery cells.

This application further provides an apparatus, and the apparatus includes a battery pack provided in this application. The battery pack may be used as a power source of the apparatus or as an energy storage unit of the apparatus. The apparatus may be but is not limited to a mobile device (for example, a mobile phone or a laptop computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite, an energy storage system, and the like. A battery pack may be selected for the apparatus based on application needs.

Figure 5:
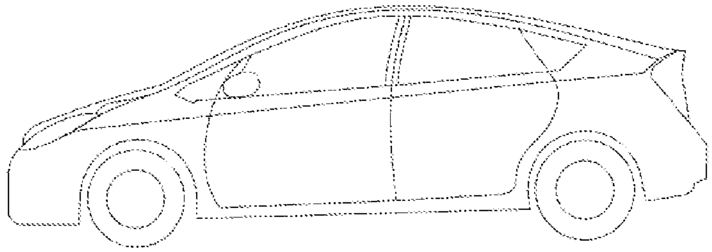
FIG. 5 is a schematic diagram of an apparatus using a battery pack in one embodiment of this application as a power source.

FIG. 5 shows an example of the apparatus. The apparatus is a battery electric vehicle, a hybrid electric vehicle, or a plug-in hybrid electric vehicle, or the like. To meet requirements of the apparatus for high power and high energy density of lithium-ion secondary batteries, a battery pack or a battery module may be used.

EXAMPLES

The following describes examples of this application. The examples described below are illustrative and used only for explaining this application, and cannot be construed as limitations on this application. Examples where technical solutions or conditions are not specified are made in accordance with technical solutions or conditions described in literature in the field or made in accordance with product instructions. The reagents or instruments used are all conventional products that are commercially available if no manufacturer is indicated.

Preparation of Binder

Preparation Example 1

At room temperature, 60.92 g of methyl acrylate, 33.04 g of acrylonitrile, and 6.04 g of acrylamide were weighed at a molar ratio of 50:44:6 to obtain a total of 100 g of mixed monomers. The mixed monomers were added to a 500 mL four-necked flask equipped with a mechanical stirrer, a thermometer and a condenser tube. 3 g of sodium dodecyl sulfate emulsifier, 1 g of ammonium persulfate initiator, and 120 g of deionized water were added. All of the foregoing constituents were stirred at a speed of 1600 rpm for 30 minutes for emulsification. The temperature was increased to 75° C. under nitrogen protection and maintained so for 4 hours for reaction; and then a pH value was adjusted to 6-8 and the temperature was immediately reduced to below 40° C. to obtain a product.

Preparation Examples 2-5

Preparation Examples 2-5 had the same steps as Preparation Example 1 except that the molar ratio of the monomers was changed to 51:43:6, 52:42:6, 53:41:6, 54:40:6 sequentially, and mass of the three monomers was calculated based on the total mass of 100 g.

Preparation Example 6

At room temperature, 69.71 g of n-butyl acrylate, 24.90 g of acrylonitrile, and 5.39 g of N-hydroxymethyl acrylamide were weighed at a molar ratio of 51:44:5 to obtain a total of 100 g of mixed monomers. The mixed monomers were added to a 500 mL four-necked flask equipped with a mechanical stirrer, a thermometer and a condenser tube. 3 g of sodium dodecyl sulfate emulsifier, 1 g of ammonium persulfate initiator, and 120 g of deionized water were added. All of the foregoing constituents were stirred at a speed of 1600 rpm for 30 minutes for emulsification. The temperature was increased to 75° C. under nitrogen protection and maintained so for 4 hours for reaction; and then a pH value was adjusted to 6-8 and the temperature was immediately reduced to below 40° C. to obtain a product.

Preparation Examples 7-10

Preparation Examples 7-10 had the same steps as Preparation Example 6 except that the molar ratio of the monomers was changed to 52:43:5, 53:42:5, 54:41:5, 55:40:5 sequentially, and mass of the three monomers was calculated based on the total mass of 100 g.

Preparation Example 11

At room temperature, 68.42 g of ethyl methacrylate, 26.91 g of acrylonitrile, and 4.66 g of N-hydroxymethyl acrylamide were weighed at a molar ratio of 52:44:4 to obtain a total of 100 g of mixed monomers. The mixed monomers were added to a 500 mL four-necked flask equipped with a mechanical stirrer, a thermometer and a condenser tube. 3 g of sodium dodecyl sulfate emulsifier, 1 g of ammonium persulfate initiator, and 120 g of deionized water were added. All of the foregoing constituents were stirred at a speed of 1600 rpm for 30 minutes for emulsification. The temperature was increased to 75° C. under nitrogen protection and maintained so for 4 hours for reaction; and then a pH value was adjusted to 6-8 and the temperature was immediately reduced to below 40° C. to obtain a product.

Preparation Examples 12-15

Preparation Examples 12-15 had the same steps as Preparation Example 11 except that the molar ratio of the monomers was changed to 53:43:4, 54:42:4, 55:41:4, 56:40:4 sequentially, and mass of the three monomers was calculated based on the total mass of 100 g.

Preparation Example 16

At room temperature, 67.94 g of 2-hydroxyethyl methacrylate, 29.08 g of methacrylonitrile, and 2.99 g of N-butoxymethyl acrylamide were weighed at a molar ratio of 53:44:3 to obtain a total of 100 g of mixed monomers. The mixed monomers were added to a 500 mL four-necked flask equipped with a mechanical stirrer, a thermometer and a condenser tube. 3 g of sodium dodecyl sulfate emulsifier, 1 g of ammonium persulfate initiator, and 120 g of deionized water were added. All of the foregoing constituents were stirred at a speed of 1600 rpm for 30 minutes for emulsification. The temperature was increased to 75° C. under nitrogen protection and maintained so for 4 hours for reaction; and then a pH value was adjusted to 6-8 and the temperature was immediately reduced to below 40° C. to obtain a product.

Preparation Examples 17-20

Preparation Examples 17-20 had the same steps as Preparation Example 16 except that the molar ratio of the monomers was changed to 54:43:3, 55:42:3, 56:41:3, 57:40:3 sequentially, and mass of the three monomers was calculated based on the total mass of 100 g.

Preparation Example 21

At room temperature, 70.44 g of 2-hydroxypropyl methacrylate, 26.71 g of methacrylonitrile, and 2.85 g of N-butoxymethyl acrylamide were weighed at a molar ratio of 54:44:2 to obtain a total of 100 g of mixed monomers. The mixed monomers were added to a 500 mL four-necked flask equipped with a mechanical stirrer, a thermometer and a condenser tube. 3 g of sodium dodecyl sulfate emulsifier, 1 g of ammonium persulfate initiator, and 120 g of deionized water were added. All of the foregoing constituents were stirred at a speed of 1600 rpm for 30 minutes for emulsification. The temperature was increased to 75° C. under nitrogen protection and maintained so for 4 hours for reaction; and then a pH value was adjusted to 6-8 and the temperature was immediately reduced to below 40° C. to obtain a product.

Preparation Examples 22-25

Preparation Examples 22-25 had the same steps as Preparation Example 21 except that the molar ratio of the monomers was changed to 55:43:2, 56:42:2, 57:41:2, 58:40:2 sequentially, and mass of the three monomers was calculated based on the total mass of 100 g.

Comparative Preparation Example 1

At room temperature, 69.50 g of methyl acrylate, 22.85 g of acrylonitrile, and 7.65 g of acrylamide were weighed at a molar ratio of 60:32:8 to obtain a total of 100 g of mixed monomers. The mixed monomers were added to a 500 mL four-necked flask equipped with a mechanical stirrer, a thermometer and a condenser tube. 3 g of sodium dodecyl sulfate emulsifier, 1 g of ammonium persulfate initiator, and 120 g of deionized water were added. All of the foregoing constituents were stirred at a speed of 1600 rpm for 30 minutes for emulsification. The temperature was increased to 75° C. under nitrogen protection and maintained so for 4 hours for reaction; and then a pH value was adjusted to 6-8 and the temperature was immediately reduced to below 40° C. to obtain a product.

Comparative Preparation Example 2

At room temperature, 74.42 g of 2-hydroxyethyl methacrylate and 25.58 g of methacrylonitrile were weighed at a molar ratio of 60:40 to obtain a total of 100 g of mixed monomers. The mixed monomers were added to a 500 mL four-necked flask equipped with a mechanical stirrer, a thermometer and a condenser tube. 3 g of sodium dodecyl sulfate emulsifier, 1 g of ammonium persulfate initiator, and 120 g of deionized water were added. All of the foregoing constituents were stirred at a speed of 1600 rpm for 30 minutes for emulsification. The temperature was increased to 75° C. under nitrogen protection and maintained so for 4 hours for reaction; and then a pH value was adjusted to 6-8 and the temperature was immediately reduced to below 40° C. to obtain a product.

Comparative Preparation Example 3

At room temperature, 44.70 g of methyl acrylate, 52.56 g of 2-hydroxypropyl methacrylate, and 2.73 g of acrylamide were weighed at a molar ratio of 54:42:4 to obtain a total of 100 g of mixed monomers. The mixed monomers were added to a 500 mL four-necked flask equipped with a mechanical stirrer, a thermometer and a condenser tube. 3 g of sodium dodecyl sulfate emulsifier, 1 g of ammonium persulfate initiator, and 120 g of deionized water were added. All of the foregoing constituents were stirred at a speed of 1600 rpm for 30 minutes for emulsification. The temperature was increased to 75° C. under nitrogen protection and maintained so for 4 hours for reaction; and then a pH value was adjusted to 6-8 and the temperature was immediately reduced to below 40° C. to obtain a product.

A gel permeation chromatography instrument was used to measure the weight-average molecular weights (measured in g/mol) of the binders in Preparation Examples 1-25 and Comparative Preparation Examples 1-3. See Table 1 for the results.

TABLE 1

Composition and molecular weights of binders in Preparation Examples 1-25 and Comparative Preparation Examples 1-2

| No. | Monomer 1 | Monomer 2 | Monomer 3 | Molar ratio | Weight-average molecular weight |
|---|---|---|---|---|---|
| Preparation Example 1 | Methyl acrylate | Acrylonitrile | Acrylamide | 50:44:6 | 63300 |
| Preparation Example 2 | Methyl acrylate | Acrylonitrile | Acrylamide | 51:43:6 | 64100 |
| Preparation Example 3 | Methyl acrylate | Acrylonitrile | Acrylamide | 52:42:6 | 74500 |
| Preparation Example 4 | Methyl acrylate | Acrylonitrile | Acrylamide | 53:41:6 | 79300 |
| Preparation Example 5 | Methyl acrylate | Acrylonitrile | Acrylamide | 54:40:6 | 87100 |

TABLE 1-continued

Composition and molecular weights of binders in Preparation Examples 1-25 and Comparative Preparation Examples 1-2

| No. | Monomer 1 | Monomer 2 | Monomer 3 | Molar ratio | Weight-average molecular weight |
|---|---|---|---|---|---|
| Preparation Example 6 | n-butyl acrylate | Acrylonitrile | N-hydroxymethyl acrylamide | 51:44:5 | 76200 |
| Preparation Example 7 | n-butyl acrylate | Acrylonitrile | N-hydroxymethyl acrylamide | 52:43:5 | 80200 |
| Preparation Example 8 | n-butyl acrylate | Acrylonitrile | N-hydroxymethyl acrylamide | 53:42:5 | 87800 |
| Preparation Example 9 | n-butyl acrylate | Acrylonitrile | N-hydroxymethyl acrylamide | 54:41:5 | 90100 |
| Preparation Example 10 | n-butyl acrylate | Acrylonitrile | N-hydroxymethyl acrylamide | 55:40:5 | 91600 |
| Preparation Example 11 | Ethyl methacrylate | Acrylonitrile | N-hydroxymethyl acrylamide | 52:44:4 | 90500 |
| Preparation Example 12 | Ethyl methacrylate | Acrylonitrile | N-hydroxymethyl acrylamide | 53:43:4 | 101200 |
| Preparation Example 13 | Ethyl methacrylate | Acrylonitrile | N-hydroxymethyl acrylamide | 54:42:4 | 102900 |
| Preparation Example 14 | Ethyl methacrylate | Acrylonitrile | N-hydroxymethyl acrylamide | 55:41:4 | 110500 |
| Preparation Example 15 | Ethyl methacrylate | Acrylonitrile | N-hydroxymethyl acrylamide | 56:40:4 | 115000 |
| Preparation Example 16 | 2-hydroxyethyl methacrylate | Methacrylonitrile | N-butoxymethyl acrylamide | 53:44:3 | 90600 |
| Preparation Example 17 | 2-hydroxyethyl methacrylate | Methacrylonitrile | N-butoxymethyl acrylamide | 54:43:3 | 100500 |
| Preparation Example 18 | 2-hydroxyethyl methacrylate | Methacrylonitrile | N-butoxymethyl acrylamide | 55:42:3 | 103900 |
| Preparation Example 19 | 2-hydroxyethyl methacrylate | Methacrylonitrile | N-butoxymethyl acrylamide | 56:41:3 | 110300 |
| Preparation Example 20 | 2-hydroxyethyl methacrylate | Methacrylonitrile | N-butoxymethyl acrylamide | 57:40:3 | 115000 |
| Preparation Example 21 | 2-hydroxypropyl methacrylate | Methacrylonitrile | N-butoxymethyl acrylamide | 54:44:2 | 85600 |
| Preparation Example 22 | 2-hydroxypropyl methacrylate | Methacrylonitrile | N-butoxymethyl acrylamide | 55:43:2 | 93700 |
| Preparation Example 23 | 2-hydroxypropyl methacrylate | Methacrylonitrile | N-butoxymethyl acrylamide | 56:42:2 | 100300 |
| Preparation Example 24 | 2-hydroxypropyl methacrylate | Methacrylonitrile | N-butoxymethyl acrylamide | 57:41:2 | 110300 |
| Preparation Example 25 | 2-hydroxypropyl methacrylate | Methacrylonitrile | N-butoxymethyl acrylamide | 58:40:2 | 118800 |
| Comparative Preparation Example 1 | Methyl acrylate | Acrylonitrile | Acrylamide | 60:32:8 | 125500 |
| Comparative Preparation Example 2 | 2-hydroxyethyl methacrylate | Methacrylonitrile | N-butoxymethyl acrylamide | 60:40:0 | 58400 |
| Comparative Preparation Example 3 | Methyl acrylate | 2-hydroxypropyl methacrylate | Acrylamide | 54:42:4 | 86700 |

Preparation of Lithium-Ion Battery

Example 1

Preparation of Separator

A commercially available PP-PE copolymer microporous film with a thickness of 20 μm and an average pore size of 80 nm (from Zhuogao Electronic Technology Company, model 20) was used as a substrate. The binder in Preparation Example 2, thermally expandable microspheres, and alumina were stirred and mixed in deionized water at a mass ratio of 28:15:57 to obtain a uniform slurry. The thermally expandable microspheres had a glass transition temperature of 65° C. and a median particle size of 0.8 μm. The ceramic particles were silica, with a median particle size of 0.8 μm. The slurry was applied on the substrate at a coating density of 0.5 $g/m^2$ and dried to remove water, and then winding was performed to obtain a separator.

Preparation of Positive Electrode Plate

Polyvinylidene fluoride (PVDF), lithium iron phosphate (LFP), a conductive agent carbon black, and N-methylpyrrolidone (NMP) were stirred and mixed at a weight ratio of 1.2:58.38:0.42:40 to obtain a uniform positive electrode slurry. The positive electrode slurry was evenly applied on a positive electrode current collector of aluminum foil, followed by drying, cold pressing, and slitting to obtain a positive electrode plate.

Preparation of Negative Electrode Plate

A negative electrode active material artificial graphite, a conductive agent acetylene black, a binder styrene-butadiene rubber (SBR), and a thickener sodium carboxymethyl cellulose (CMC-Na) were dissolved in a solvent of deionized water at a mass ratio of 96.2:1.0:1.6:1.2, stirred fully, and mixed evenly to obtain a negative electrode slurry. The negative electrode slurry was applied on a negative electrode current collector copper foil, followed by drying, cold pressing, and cutting to obtain a negative electrode plate.

Preparation of Electrolyte

Ethylene carbonate (EC), ethyl methyl carbonate (EMC), and diethyl carbonate (DEC) were mixed at a volume ratio of 1:1:1, and $LiPF_6$ was dissolved uniformly in the solution to obtain an electrolyte. In the electrolyte, the concentration of $LiPF_6$ is 1 mol/L.

Preparation of Lithium-Ion Battery

The foregoing positive electrode plate, separator, and negative electrode plate were stacked in sequence and wound to obtain an electrode assembly. The electrode assembly was put into an outer package, and the electrolyte prepared was injected, followed by packaging, standing, formation, aging, and other processes to obtain a lithium-ion battery.

Examples 2-4

Examples 2-4 had the same steps as Example 1 except that the glass transition temperatures of thermally expandable microspheres were changed to 78° C., 89° C., and 106° C. respectively.

Examples 5-8

Examples 5-8 had the same steps as Example 1 except that the binder was selected from Preparation Example 8, the glass transition temperature of the thermally expandable microspheres was changed to 89° C., with the median particle size changed to 0.2 μm, 1 μm, 1.7 μm, and 2.2 μm respectively, and the ceramic particles were changed to alumina.

Examples 9-12

Examples 9-12 had the same steps as Example 3 except that the binder was selected from Preparation Example 13, and the ceramic particles were changed to bumite, with the median particle size changed to 1.0 μm, 2.1 μm, 3.9 μm, and 5.5 μm respectively.

Examples 13-16

Examples 13-16 had the same steps as Example 3 except that the binder was selected for Preparation Example 22, the ceramic particles were changed to titanium dioxide, and the mass ratios of the binder, the thermally expandable microspheres, and the ceramic particles were changed to 20:20:60, 24:18:58, 28:16:56, and 32:14:54 respectively.

Comparative Examples 1-3

Comparative Examples 1-3 had the same steps as Example 3 except that the binders were selected from Comparative Preparation Example 1, Comparative Preparation Example 2, and Comparative Preparation Example 3 respectively.

Gas permeability of the separators prepared in Examples 1-16 and Comparative Examples 1-3 were measured at room temperature and a temperature of 100° C., and the results were listed in Table 2 below.

Method for measuring gas permeability: The separator was cut into a 5 cm-sized square, a gas permeability meter was used to apply pressure of 1.21 kPa, and test the time required for 100 ml of gas passing through the $6.45cm^2$ of separator to obtain gas permeability which is measured in s/100 ml.

TABLE 2

Measurement results of gas permeability of separators in Examples 1-16 and Comparative Examples 1-3

| | | Thermally expandable microspheres | | Ceramic particles | | | |
|---|---|---|---|---|---|---|---|
| No. | Binder | Glass transition temperature (° C.) | Median particle size (μm) | Median particle size (μm) | Binder:thermally expandable microspheres:ceramic particles | Gas permeability (s/100 ml) | Gas permeability after heating at 100° C. (s/100 ml) |
| Example 1 | Preparation Example 2 | 65.0 | 0.8 | 2.6 | 28:15:57 | 298.0 | ≥2000 |
| Example 2 | Preparation Example 2 | 78.0 | 0.8 | 2.6 | 28:15:57 | 357.0 | ≥2000 |
| Example 3 | Preparation Example 2 | 89.0 | 0.8 | 2.6 | 28:15:57 | 350.0 | ≥2000 |
| Example 4 | Preparation Example 2 | 106.0 | 0.8 | 2.6 | 28:15:57 | 432.0 | 1600.0 |
| Example 5 | Preparation Example 8 | 89.0 | 0.2 | 2.6 | 26:12:62 | 365.0 | ≥2000 |
| Example 6 | Preparation Example 8 | 89.0 | 1 | 2.6 | 26:12:62 | 428.0 | ≥2000 |
| Example 7 | Preparation Example 8 | 89.0 | 1.7 | 2.6 | 26:12:62 | 532.0 | ≥2000 |
| Example 8 | Preparation Example 8 | 89.0 | 2.2 | 2.6 | 26:12:62 | 790.0 | 1700 |
| Example 9 | Preparation Example 13 | 89.0 | 0.8 | 1.0 | 28:15:57 | 763.0 | ≥2000 |
| Example 10 | Preparation Example 13 | 89.0 | 0.8 | 2.1 | 28:15:57 | 650.0 | ≥2000 |
| Example 11 | Preparation Example 13 | 89.0 | 0.8 | 3.9 | 28:15:57 | 457.0 | ≥2000 |
| Example 12 | Preparation Example 13 | 89.0 | 0.8 | 5.5 | 28:15:57 | 266.0 | 1580.0 |

TABLE 2-continued

Measurement results of gas permeability of separators in Examples 1-16 and Comparative Examples 1-3

| No. | Binder | Thermally expandable microspheres Glass transition temperature (° C.) | Median particle size (μm) | Ceramic particles Median particle size (μm) | Binder:thermally expandable microspheres:ceramic particles | Gas permeability (s/100 ml) | Gas permeability after heating at 100° C. (s/100 ml) |
|---|---|---|---|---|---|---|---|
| Example 13 | Preparation Example 22 | 89.0 | 0.8 | 2.6 | 20:20:60 | 210.0 | 1500.0 |
| Example 14 | Preparation Example 22 | 89.0 | 0.8 | 2.6 | 24:18:58 | 376.0 | ≥2000 |
| Example 15 | Preparation Example 22 | 89.0 | 0.8 | 2.6 | 28:16:56 | 527.0 | ≥2000 |
| Example 16 | Preparation Example 22 | 89.0 | 0.8 | 2.6 | 32:14:54 | 650.0 | 1300.0 |
| Comparative Example 1 | Comparative Preparation Example 1 | 89.0 | 0.8 | 2.6 | 28:15:57 | 320.0 | 1390.0 |
| Comparative Example 2 | Comparative Preparation Example 2 | 89.0 | 0.8 | 2.6 | 28:15:57 | 420.0 | 1450.0 |
| Comparative Example 3 | Comparative Preparation Example 3 | 89.0 | 0.8 | 2.6 | 28:15:57 | 526.0 | 1860.0 |

It can be seen from the comparison between Example 3 with Comparative Examples 1-3 that when the terpolymer of this application is used as the binder for the separator, a transmission rate of the lithium-ion battery containing such separator can be significantly reduced under the same conditions. Specifically, the gas permeability greatly rises after the lithium-ion battery is heated to 100° C. The great rise of gas permeability indicates that the time required for the same volume of gas to pass through is significantly increased, meaning that the lithium-ion battery of Example 3 has higher shielding performance at high temperatures, and is less prone to short circuits and thermal runaway.

In addition, in a case that the same binder is used, the glass transition temperature of thermally expandable microspheres being higher than 100° C. will reduce the gas permeability, thereby degrading the shielding performance of the separator (see Example 4). Similarly, when the median particle size $D_v50$ of the thermally expandable microspheres is greater than 2.0 μm, the gas permeability of the resulting separator is also significantly reduced (see Example 8). In addition, the median particle size of the ceramic particles also affects the gas permeabilization performance of the separator. When the median particle size of the ceramic particles is greater than 5 μm, the gas permeability of the resulting separator is also significantly reduced (see Example 12).

Furthermore, the weight ratio of the binder, the thermally expandable microspheres, and the ceramic particles in the binding layer of the separator may also affect the gas permeabilization performance of the separator. As can be seen from the comparison between Examples 13-16, a separator with higher gas permeability at 100° C. can be obtained by selecting the three constituents in a specified range.

Although this application has been described with reference to the embodiments, various modifications can be made to this application without departing from the scope of this application and the constituents therein can be replaced with their equivalents. In particular, in absence of structural conflict, the various technical features mentioned in the embodiments can be combined in any manner. This application is not limited to the specific embodiments disclosed in this specification but includes all technical solutions falling within the scope of the claims.

The invention claimed is:

1. A separator comprising a base layer and a binding layer stacked sequentially;

wherein the binding layer comprises a binder, the binder consisting of a terpolymer, thermally expandable microspheres, and ceramic particles, wherein monomer units of the terpolymer consist of a first monomer unit, a second monomer unit, and a third monomer unit; wherein the first monomer unit is selected from methyl acrylate, n-butyl acrylate, ethyl methacrylate, 2-hydroxyethyl methacrylate, 2-hydroxypropyl methacrylate; the second monomer unit is selected from at least one of acrylonitrile and methacrylonitrile; the third monomer unit is selected from at least one of acrylamide, N-hydroxymethyl acrylamide, and N-butoxymethyl acrylamide; and a molar ratio of the first monomer unit, the second monomer unit, and the third monomer unit is 50-58:40-44:2-6, a weight-average molecular weight Mw of the terpolymer is 60000-120000 g/mol;

a mass ratio of the binder, the thermally expandable microspheres, and the ceramic particles in the binding layer is 25-30:10-20:50-65.

2. The separator according to claim 1, wherein a glass transition temperature Tg of the terpolymer is −20° C. to 40° C.

3. The separator according to claim 1, wherein a glass transition temperature of the thermally expandable microspheres is 40-100° C.

4. The separator according to claim 3, wherein a median particle size $D_v50$ of the thermally expandable microspheres is 0.1 μm-2 μm.

5. The separator according to claim 1, wherein the ceramic particles are at least one of alumina, boehmite, silica, and titanium dioxide, with a median particle size $D_v50$ of 0.5 μm-5 μm.

6. The separator according to claim 1, wherein the first monomer unit is methyl acrylate, the second monomer unit is acrylonitrile, the third monomer unit is acrylamide.

7. The separator according to claim 1, wherein the first monomer unit is n-butyl acrylate, the second monomer unit is acrylonitrile, the third monomer unit is N-hydroxymethyl acrylamide.

8. The separator according to claim 1, wherein the first monomer unit is ethyl methacrylate, the second monomer unit is acrylonitrile, the third monomer unit is N-hydroxymethyl acrylamide.

9. The separator according to claim 1, wherein the first monomer unit is 2-hydroxyethyl methacrylate, the second monomer unit is methacrylonitrile, the third monomer unit is N-butoxymethyl acrylamide.

10. A lithium-ion battery, comprising the separator according to claim 1.

11. A battery pack, comprising the lithium-ion battery according to claim 10.

12. An electric apparatus, comprising the battery according to claim 11.

* * * * *